United States Patent [19]
Burrows

[11] Patent Number: 4,752,389
[45] Date of Patent: Jun. 21, 1988

[54] WATER PURIFICATION SYSTEM WITH PURIFIED WATER COOLING APPARATUS

[76] Inventor: Bruce D. Burrows, 25145 West Avenue Stanford, Valencia, Calif. 91355

[21] Appl. No.: 31,753

[22] Filed: Mar. 30, 1987

[51] Int. Cl.[4] .................................................. C02F 9/00
[52] U.S. Cl. .................................... 210/181; 210/257.2
[58] Field of Search ................... 210/181, 257.2, 433.2

[56] References Cited

U.S. PATENT DOCUMENTS

| | | | |
|---|---|---|---|
| 2,954,799 | 10/1960 | Kryzer et al. | 137/599.1 |
| 3,089,513 | 5/1963 | Kirk | 137/505.34 |
| 3,493,496 | 2/1970 | Bray | 210/23 |
| 3,542,199 | 11/1970 | Bray | 210/116 |
| 3,568,843 | 3/1971 | Brown | 210/258 |
| 3,719,593 | 3/1973 | Astil | 210/135 |
| 3,726,793 | 4/1973 | Bray | 210/23 |
| 3,831,757 | 8/1974 | Gossett | 210/143 |
| 3,887,463 | 6/1975 | Bray | 210/110 |
| 3,963,612 | 6/1976 | Gossett | 210/143 |
| 3,967,638 | 7/1976 | Tondreau | 137/216 |
| 4,021,343 | 5/1977 | Tyler | 210/110 |
| 4,086,166 | 4/1978 | Martin | 210/134 |
| 4,176,063 | 11/1979 | Tyler | 210/101 |
| 4,210,533 | 7/1980 | Astil | 210/136 |
| 4,288,326 | 9/1981 | Keefer | 210/637 |
| 4,316,774 | 2/1982 | Trusch | 210/640 X |
| 4,347,132 | 8/1982 | Davis | 210/104 |
| 4,391,712 | 7/1983 | Tyler | 210/652 |
| 4,585,554 | 4/1986 | Burrows | 210/433.2 X |
| 4,595,497 | 6/1986 | Burrows | 210/433.2 |
| 4,604,194 | 8/1986 | Entingh | 210/98 |
| 4,657,674 | 4/1987 | Burrows | 210/110 |

OTHER PUBLICATIONS

Perry, Robert H., et al, Chemical Engineers' Handbook, 5th Edition, McGraw-Hill Book Co., N.Y., 1973, pp. 11–18.
U.S. Department of Commerce Patent Office Academy Formality Term List, Topic 7d, 1977.

*Primary Examiner*—Ivars Cintins
*Attorney, Agent, or Firm*—Kelly, Bauersfeld & Lowry

[57] ABSTRACT

A water purification system includes cooling apparatus for reducing the temperature of purified water produced by the system. The purification system includes, for example, a reverse osmosis unit for producing a supply of purified water by removal of impurities from standard tap water, wherein the purified water is stored within a reservoir tank ready for use. The cooling apparatus comprises a thermoelectric heat transfer module adapted to transfer thermal energy from a cold side to a hot side of the module. The module is mounted on the reservoir tank with its cold side in thermal communication with the stored purified water to extract heat energy therefrom. The hot side of the thermoelectric module is thermally communicated with a system water flow particularly such as a flow of waste water produced by the reverse osmosis unit, or the tap water flow, wherein this system flow provides a compact heat sink carrying heat energy away from the module to provide efficient cooling of the purified water supply.

19 Claims, 3 Drawing Sheets

WATER PURIFICATION SYSTEM WITH PURIFIED WATER COOLING APPARATUS

BACKGROUND OF THE INVENTION

This invention relates generally to improvements in water purification systems of the type adapted to provide a supply of purified water for use in drinking, cooking, etc. More particularly, this invention relates to a water purification system designed primarily for household use, and including compact and efficient cooling apparatus for chilling the produced supply of purified water.

Water purification systems in general are relatively well-known in the art for use in producing a supply of purified water from ordinary tap water or the like. Such water purification systems commonly include a reverse osmosis unit having an inlet connected to a tap water supply, wherein the reverse osmosis unit produces two water outflows including a purified water supply and a waste water supply, sometimes referred to as brine, with impurities concentrated therein. In purification systems of this type the production of purified water is normally relatively slow, whereby the purified water outflow is typically coupled to and stored within an appropriate storage tank ready for dispensing when desired through a faucet valve or the like. Such purification systems are normally intended for installation into the cabinet space beneath a standard residential kitchen sink, with the faucet valve mounted on or at the sink in an accessible position ready for use. Examples of water purification systems of this general type are found, for example, by reference to U.S. Pat. Nos. 4,585,554 and 4,595,497.

In some prior art water purification systems of the general type described above, cooling or chilling equipment has been proposed for reducing the temperature of the purified water supply within the storage tank. With such equipment, the purified water can be dispensed at a refrigerated temperature to provide a highly pleasing source of water for drinking and other uses. However, such cooling or chilling equipment has normally included mechanical refrigeration systems which undesirably increase the overall cost, complexity, size, and operational noise of the purification system. Alternate cooling system proposals have suggested the use of relatively compact thermoelectric heat transfer cooling modules, but these proposals have required relatively large surface area heat sinks and/or the use of cooling fans to obtain satisfactory transfer of thermal energy from the purified water supply. The use of large heat sinks and/or cooling fans in a water purification system designed for under-the-sink installation, however, creates significant system size problems as well as undesirable increases in system cost. Moreover, in many instances, the closed nature of the cabinet installation results in significant air flow limitations preventing adequate heat transfer when a cooling fan is used.

There exists, therefore, a significant need for an improved water purification system designed for under-the-sink installation in a compact, space-efficient manner while providing compact and efficient means for chilling a stored supply of purified water. The present invention fulfills these needs and provides further related advantages.

SUMMARY OF THE INVENTION

In accordance with the invention, an improved water purification system is provided with compact, energy-efficient and relatively simple means for reducing the temperature of purified water produced by the purification system. The temperature reducing means comprises a thermoelectric heat transfer module arranged to draw thermal energy from the supply of purified water stored within a reservoir tank, and to transfer the thermal energy to a system water flow particularly such as a flow of waste water produced by the purification system.

In one preferred system arrangement, the purification system includes a reverse osmosis module having an inlet coupled to a supply of ordinary tap water or the like. The reverse osmosis module operates in a known manner to produce dual water outflows, namely, a supply of purified water with impurities substantially removed therefrom and a supply of waste water or brine with impurities concentrated therein. The purified water supply is stored within a reservoir tank ready for dispensing, for example, through a faucet valve, whereas the waste water supply is ultimately discharged to a drain. In a preferred system, the waste water is utilized in concert with the tap water to control overall system operational pressures and flows as described, for example, in U.S. Pat. Nos. 4,585,554; 4,595,497; and copending application Ser. No. 685,546, now abandoned in favor of Ser. No. 001,042, filed Jan. 7, 1987.

The thermoelectric heat transfer module has a cold side mounted in heat exchange relation with the purified water within the reservoir tank. The module is adapted for connection to a suitable power source, preferably a standard domestic ac power supply via a 12-volt dc transformer. The module operates to draw thermal energy from the purified water supply and to transfer that energy to a hot side of the module. This hot side of the module is mounted in heat exchange relation with a relatively cool system water flow such as the waste water supply which provides a compact heat sink carrying the thermal energy away from the hot side of the module. In an alternate arrangement, the system water flow may constitute the tap water flow to the reverse osmosis unit, thereby partially heating the tap flow for improved unit operational efficiency. If desired, temperature sensor means may be provided to detect the chilled temperature of the purified water and to inactivate the module when the temperature falls to a prescribed lower limit, for example, 45 to 50 degrees Farenheit.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
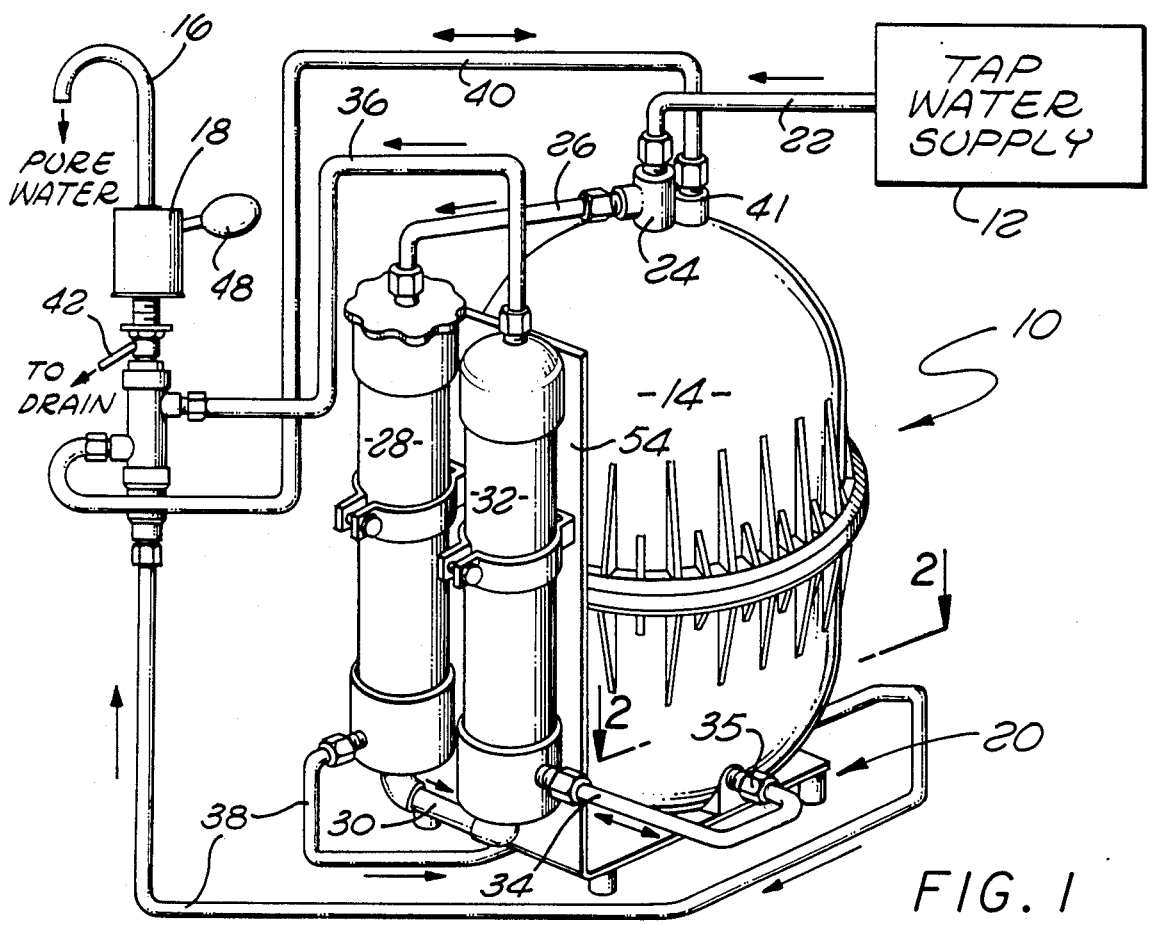
FIG. 1 is a perspective view illustrating a water purification system including cooling apparatus embodying the novel features of the invention.

As shown in the exemplary drawings, an improved water purification system referred to generally in FIG. 1 by the reference numeral 10 is provided for producing purified water from a supply of ordinary tap water 12 or the like. The produced purified water is stored within a storage reservoir tank 14 ready for dispensing through the discharge spout 16 of a faucet valve 18. In accordance with the invention, the system 10 includes a compact and energy-efficient cooling apparatus, referred to generally in FIG. 1 by the reference numeral 20, for chilling the supply of purified water within the reservoir tank 14.

The illustrative water purification system 10 is designed to provide a ready supply of substantially purified water for drinking, cooking purposes, etc. The system 10 is adapted for residential or household use for installation typically within the compact cabinet space beneath a kitchen sink or the like, with the faucet valve 18 being normally mounted in a position extending through a sink drain board (not shown in FIG. 1). The purification system 10 includes relatively simple water treatment equipment for treating ordinary tap water 12 to remove undesired salts, particulates and other impurities to produce the purified water supply. For examples of water purification systems of this general type, see U.S. Pat. Nos. 4,585,554; 4,595,497; and copending application Ser. No. 685,546, now abandoned in favor of Ser. No. 001,042, filed Jan. 7, 1987, which are incorporated by reference herein.

In accordance with the present invention, the water purification system 10 incorporates the cooling apparatus 20 of relatively simple, highly compact and energy-efficient design reducing the temperature of the produced purified water supply. The cooling apparatus 20 chills the purified water supply during storage thereof within the reservoir tank 14 such that dispensed purified water is refrigerated to provide a highly pleasing source of water for drinking and other uses. Importantly, the size and functional operation of the cooling apparatus 20 is completely compatible with an overall compact and quiet system adapted for conventional under-the-sink installation.

As shown generally in FIG. 1, the purification system 10 includes a tap water supply conduit 22 for coupling the flow of ordinary tap water 12 to a regulator valve 24 mounted on the top of the reservoir 14. In normal operation, the regulator valve 24 directs the tap water supply 12 through a feed conduit 26 to a reverse osmosis unit 28 typically having an elongated cylinder or cartridge-like configuration. The reverse osmosis unit 28 functions to produce the purified water supply with impurities substantially removed therefrom, wherein this purified water supply exits the unit 28 through a first discharge conduit 30 coupled to a suitable filter unit 32 such as a charcoal-containing filter cartridge or the like. From the filter unit, the purified water supply is coupled through a reservoir conduit 34 for flow into the reservoir tank 14 via a suitable fitting 35, or for flow through a dispense conduit 36 to the faucet valve 18.

The reverse osmosis unit 28 additionally produces a secondary water outflow in the form of a supply of waste water or brine having impurities concentrated therein. This waste water supply is coupled from the reverse osmosis unit through a second discharge conduit 38 to a lower end of the faucet valve 18. From the faucet valve 18, the waste water supply is directed in turn through an auxiliary conduit 40 to a separate waste water chamber (not shown in FIG. 1) within the reservoir tank 14, via a fitting 41, or to drain through a drain tube 42, in accordance with the system operational mode.

More specifically, the illustrative water purification system 10 functions generally in accordance with the systems shown and described in applicant's U.S. Pat. Nos. 4,585,554; 4,595,497; and copending application Ser. No. 685,546, now abandoned in favor of Ser. No. 001,042, filed Jan. 7, 1987, which are incorporated by reference herein. By way of brief description, however, when the faucet valve 18 is closed, purified water produced by the reverse osmosis unit 28 is supplied through the reservoir conduit 34 and tank fitting 35 into a lower tank chamber 44 disposed beneath a flexible diaphragm or barrier 45 within the tank. Purified water flow into the chamber 44 continues until the barrier 45 expels overlying waste water from the tank for flow to the drain through the fitting 41, and further through the auxiliary conduit 40 and drain tube 42. During this purified chamber filling process, additional waste water produced by the reverse osmosis unit 28 is also discharged to drain. As the purified water chamber 44 reaches a filled condition, the barrier 45 eventually engages a pressure plate 46 forming an integral portion of the regulator valve 24 to throttle or halt incoming tap water flow to the system.

When dispensing of purified water is desired, a handle 48 on the faucet valve 18 is appropriately operated to open purified water flow from the tank chamber 44 through the filter unit 32 and dispense conduit 36 to the faucet valve 18, and further for discharge through the discharge spout 16. At the same time, the faucet valve 18 directs a substantial waste water flow from the second discharge conduit 38 through the auxiliary conduit 40 into the reservoir tank above the barrier 45, whereby this waste water flow provides the driving medium for expelling purified water to the discharge spout 16. Return of the faucet handle 48 to the normally closed position returns the system 10 to a refill mode with purified water refilling the tank chamber 44, as previously described.

Figure 2:
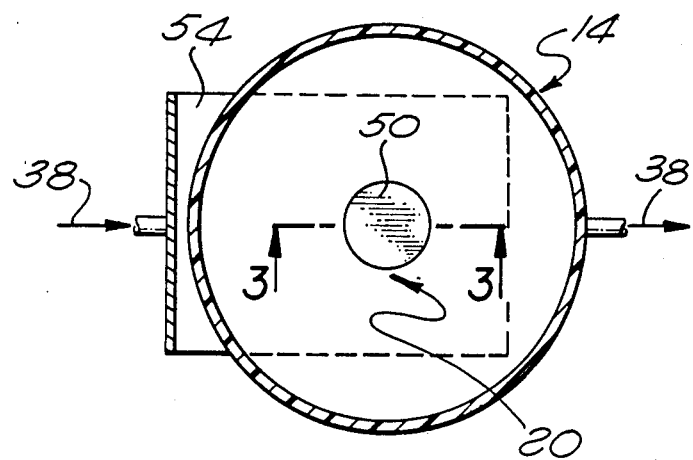
FIG. 2 is a horizontal sectional view taken generally on the line 2—2 of FIG. 1.
Figure 3:
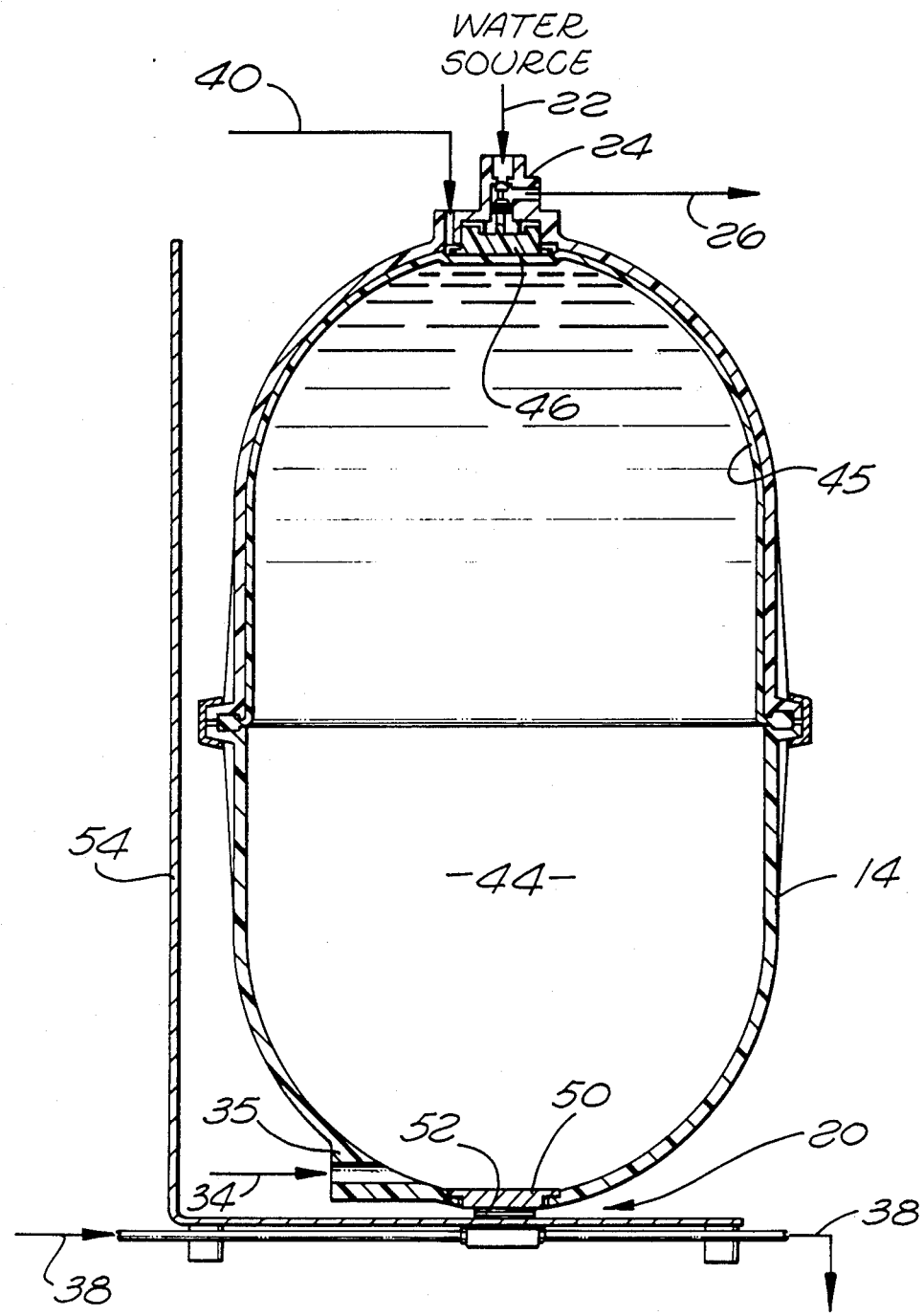
FIG. 3 is an enlarged vertical sectional view taken generally on the line 3—3 of FIG. 2.

In accordance with the invention, as shown generally in FIGS. 2 and 3, the cooling apparatus 20 is mounted at the bottom of the reservoir tank 14 in close heat transfer relation with a heat transfer plate 50 of copper or the like having an inboard surface in direct contact with the purified water supply within the purified water chamber 44. The cooling apparatus 20 generally comprises a thermoelectric heat transfer module 52 such as a module manufactured by Borg-Warner Corporation under model number 920-31 and employing semi-conductor materials with dissimilar characteristics (P-type and N-type materials) connected electrically in series and thermally in parallel. The module 52 operates to draw thermal energy from the purified water supply within the chamber 44 via the heat transfer plate 50, and to transfer that heat energy to an appropriate heat sink for dissipation. In accord with the invention, that heat sink comprises a system water flow to carry heat away from the thermoelectric module 52. Heat dissipation may be enhanced by mounting the module on an enlarged support frame 54 of extended heat transfer surface area and formed from a heat conductive material, wherein the frame 54 advantageously provides a support stand for the reservoir tank 14.

Figure 4:
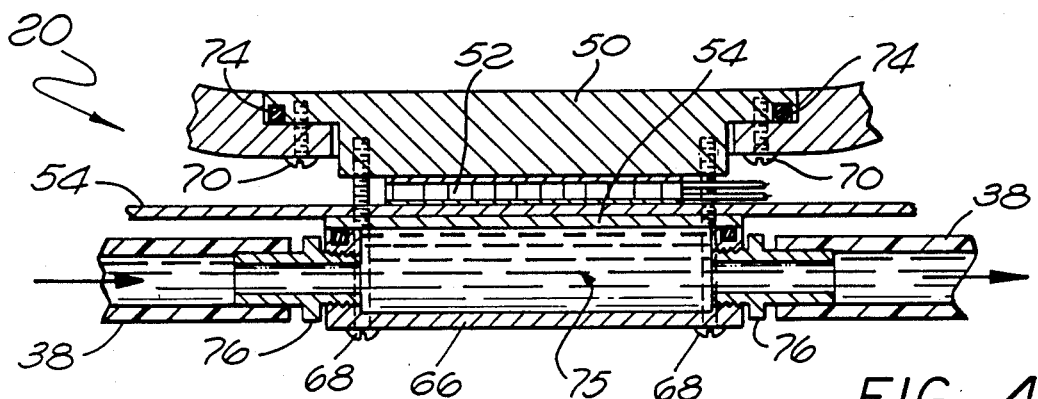
FIG. 4 is an enlarged fragmented vertical sectional view illustrating installation of the cooling apparatus at the bottom of a system reservoir tank.
Figure 5:
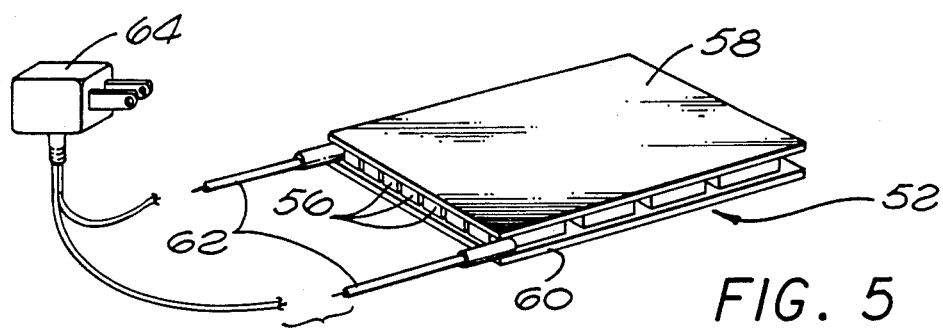
FIG. 5 is a somewhat schematic, fragmented perspective view illustrating components of the cooling apparatus.

As shown in more detail in FIGS. 4 and 5, the thermoelectric module 52 comprises a plurality of semi-conductor devices 56 sandwiched between upper and lower heat transfer substrates 58 and 60, respectively. Electrical conductors 62 are appropriately connected to the semi-conductor devices 56 and extend from the module 52 for connection to an appropriate source of electrical power. In the preferred form of the invention as shown in FIG. 5, the conductors 62 are connected to a conventional 12-volt dc transformer 64 which is adapted for plug-in connection to a conventional household ac power supply (not shown). In operation, the upper substrate 58 comprises a cold side of the module for extracting heat energy which is transferred to the lower substrate 60 thereby providing a module hot side.

The thermoelectric heat transfer module 52 is mounted in sandwiched relation between the heat transfer plate 50 and the heat conductive support frame 54, which is maintained in turn in intimate heat transfer relation with a flow-through heat exchanger 66, as shown best in FIG. 4. More particularly, mounting screws 68 may be fastened through the heat exchanger 66 and further into the underside of the heat transfer plate 50 for tight clamping of the module 52 and support frame 54 therebetween. Additional mounting screws 70 may be provided for securing the heat transfer plate 50 within a central opening 72 at the bottom of the reservoir tank 14, with an O-ring seal 74 or the like being provided to prevent water leakage from the tank.

The heat exchange 66 comprises an appropriate housing of heat conductive material defining a flow-through passage 75 connected in-line with a relatively cool system water flow, such as in-line connection with the waste water discharge conduit 38 as viewed in FIG. 4. Appropriate inlet and outlet fittings 76 are provided for leak-free connection with the conduit 38. Accordingly, waste water flow through the passage 75 of the heat exchanger 66 provides a fluid heat sink to which thermal energy from the purified water supply is transferred. This results in an effective and efficient chilling of the purified water supply, all in a compact system arrangement. The waste water supply is, of course, discharged from the conduit 38 to drain during system operation as the purified chamber 44 is refilled. Similarly, the regulator valve 24 at the top of the tank can be set to permit sufficient water flow through the conduit 38 to drain for adequate heat sink purposes when the chamber 44 is filled with purified water.

While the cooling arrangement is shown in FIGS. 1-5 in connection with the preferred water purification system design, it will be understood that the cooling arrangement can be incorporated into a wide variety of different types of water purification systems. For example, other types of valving arrangements and/or water flow or delivery systems can be provided. In addition, other relatively cool system flows may be used to provide the fluid heat sink passed through the heat exchanger 66.

Figure 6:
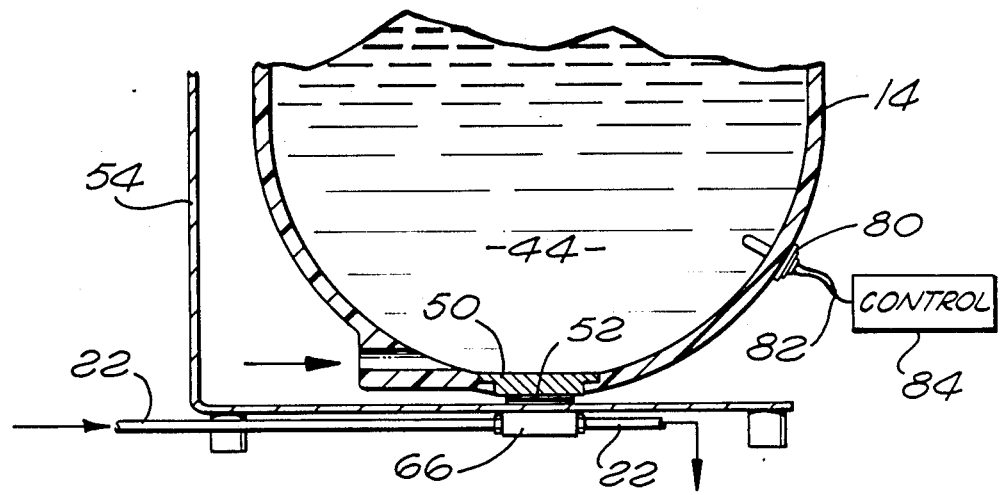
FIG. 6 is a diagrammatic view illustrating one alternative water purification system arrangement including cooling apparatus in accordance with the invention.

More particularly, in one alternate system arrangement as shown in FIG. 6, the heat exchanger 66 can be connected in-line with the tap water supply conduit 22 upstream from the reverse osmosis unit. In this arrangement, the relatively cool tap water 12 provides an effective fluid heat sink for carrying heat away from the thermoelectric module 52 to chill the purified water, while beneficially warming the tap water for improved operational efficiency of the reverse osmosis unit. In this regard, it has been found that relatively small temperature increases in the tap water supplied to the reverse osmosis unit can result in substantial improvements in operational efficiency of the unit, with a corresponding substantial increase in purified water production capacity.

In addition, as viewed in FIG. 6, a temperature sensor 80 can be provided for measuring the temperature of the purified water supply within the reservoir tank chamber 44. This temperature sensor 80 can be mounted directly upon the reservoir tank 14 and coupled via leads 82 to an appropriate control 84 which, in turn, de-activates the thermoelectric module 52 when the purified water supply reaches a lower end temperature limit, for example, on the order of about 45 to 50 degrees Farenheit. In this manner, when a demand for purified water is relatively low, the thermoelectric module 52 is prevented from excessively cooling the purified water supply, thereby preventing undesired system freeze-up. The use of the temperature sensor 80 can be incorporated, of course, into a wide range of different water purification systems irrespective of the particular system water flow passed through the heat exchanger 66.

A variety of further modifications and improvements to the invention described herein will be apparent to those skilled in the art. Accordingly, no limitation on the invention is intended by way of the description herein or the accompanying drawings, except as set forth in the appended claims.

What is claimed is:

1. A water purification system for producing purified water from a supply of tap water, said system comprising:
    water purification means having an inlet for receiving the tap water supply and for producing therefrom a supply of purified water and a supply of waste water;
    a reservoir tank having a purified water chamber therein for receiving and storing purified water;
    means for dispensing purified water from said purified water chamber;
    a thermoelectric heat transfer module having a hot side and a cold side and means for transferring thermal energy from said cold side to said hot side;
    means for mounting said module with said cold side in thermal communication with purified water within said purified water chamber;
    a heat exchanger in thermal communication with said hot side of said module and having a fluid flow path extending therethrough; and
    means for connecting one of the tap water supply and the supply of waste water for flow-through passage through said heat exchanger flow path to provide a fluid heat sink carrying heat energy away from said module hot side.

2. The system of claim 1 wherein said means for connecting comprises means for connecting the tap water supply for flow-through passage through said heat exchanger, whereby said tap water supply is heated prior to reception into said water purification means.

3. The system of claim 1 wherein said means for connecting comprises means for connecting the waste water supply for flow-through passage through said heat exchanger.

4. The system of claim 3 further including means for coupling the waste water supply from said heat exchanger to a drain.

5. The system of claim 1 wherein said mounting means comprises a heat transfer plate mounted on said reservoir tank with an inboard surface in thermal communication with purified water within the purified water chamber, and means for mounting said module generally in sandwiched relation between said heat transfer plate and said heat exchanger, said module having said cold side in heat transfer relation with said heat transfer plate.

6. The system of claim 5 wherein said heat exchanger comprises a housing formed from a heat conductive material.

7. The system of claim 5 wherein said heat transfer plate is copper.

8. The system of claim 1 further including a tank support frame formed from a heat conductive material and having a portion thereof in heat transfer relation with said module hot side.

9. The system of claim 1 further including temperature sensor means for sensing the temperature of purified water within said purified water chamber, and control means responsive to the temperature of the purified water reaching a predetermined lower end limit for deactivating said module.

10. The system of claim 1 further including an ac to dc transformer for coupling said module to a source of electrical power.

11. A water purification system for producing purified water from a supply of tap water, said system comprising:
water purification means having an inlet for receiving the tap water supply and for producing therefrom a supply of purified water and a supply of waste water;
a reservoir tank having a purified water chamber therein for receiving and storing purified water;
means for dispensing purified water from said purified water chamber;
a thermoelectric heat transfer module having a hot side and a cold side and means for transferring thermal energy from said cold side to said hot side;
means for mounting said module with said cold side in thermal communication with purified water within said purified water chamber;
a heat exchanger in thermal communication with said hot side of said module and having a fluid flow path extending therethrough;
means for connecting the waste water supply for flow-through passage through said heat exchanger flow path to provide a fluid heat sink carrying heat energy away from said module hot side, resulting in chilling of the purified water within the purified water chamber; and
means for coupling the waste water supply from said heat exchanger to a drain.

12. The system of claim 11 further including a tank support frame formed from a heat conductive material and having a portion thereof in heat transfer relation with said module hot side.

13. The system of claim 11 further including temperature sensor means for sensing the temperature of purified water within said purified water chamber, and control means responsive to the temperature of the purified water reaching a predetermined lower end limit for deactivating said module.

14. The system of claim 11 further including an ac to dc transformer for coupling said module to a source of electrical power.

15. A water purification system for producing purified water from a supply of tap water, said system comprising:
water purification means having an inlet for receiving the tap water supply and for producing therefrom a supply of purified water and a supply of waste water;
a reservoir tank having a purified water chamber therein for receiving and storing purified water;
means for dispensing purified water from said purified water chamber;
a thermoelectric heat transfer module having a hot side and a cold side and means for transferring thermal energy from said cold side to said hot side;
means for mounting said module with said cold side in thermal communication with purified water within said purified water chamber;
a heat exchanger in thermal communication with said hot side of said module and having a fluid flow path extending therethrough;
means for connecting the tap water supply for flow-through passage through said heat exchanger flow path to provide a fluid heat sink carrying heat energy away from said module hot side; and
means for coupling the tap water supply from said heat exchanger to said inlet of said water purification means.

16. The system of claim 15 wherein said mounting means comprises a heat transfer plate mounted on said reservoir tank with an inboard surface in thermal communication with purified water within the purified water chamber, and means for mounting said module generally in sandwiched relation between said heat transfer plate and said heat exchanger, said module having said cold side in heat transfer relation with said heat transfer plate.

17. The system of claim 15 further including a tank support frame formed from a heat conductive material and having a portion thereof in heat transfer relation with said module hot side.

18. The system of claim 15 further including temperature sensor means for sensing the temperature of purified water within said purified water chamber, and control means responsive to the temperature of the purified water reaching a predetermined lower end limit for deactivating said module.

19. The system of claim 15 further including an ac to dc transformer for coupling said module to a source of electrical power.

* * * * *